(12) United States Patent
Gauthier et al.

(10) Patent No.: US 8,779,306 B2
(45) Date of Patent: Jul. 15, 2014

(54) WEIGHT SENSING METHOD AND APPARATUS FOR FORKLIFTS

(75) Inventors: Steven Gauthier, Inverness, IL (US); Venkata R. Hogirala, Mount Prospect, IL (US); Alexander Nikon, Wheeling, IL (US)

(73) Assignee: Methode Electronics, Inc., Chicago, IL (US)

( * ) Notice: Subject to any disclaimer, the term of this patent is extended or adjusted under 35 U.S.C. 154(b) by 206 days.

(21) Appl. No.: 13/032,439

(22) Filed: Feb. 22, 2011

(65) Prior Publication Data

US 2011/0206483 A1    Aug. 25, 2011

Related U.S. Application Data

(60) Provisional application No. 61/306,264, filed on Feb. 19, 2010, provisional application No. 61/325,083, filed on Apr. 16, 2010.

(51) Int. Cl.
*G01G 19/14* (2006.01)
*B66F 9/075* (2006.01)

(52) U.S. Cl.
USPC ........................................................ 177/147

(58) Field of Classification Search
USPC ......... 177/136–141, 201, 211, 145, 147, 258, 177/229
See application file for complete search history.

(56) References Cited

U.S. PATENT DOCUMENTS

| | | | | |
|---|---|---|---|---|
| 4,212,360 A * | 7/1980 | Chesher | ......................... | 177/139 |
| 4,323,132 A * | 4/1982 | Bradley | ......................... | 177/139 |
| 4,421,186 A * | 12/1983 | Bradley | ......................... | 177/139 |
| 5,666,295 A * | 9/1997 | Bruns | ............................ | 702/174 |
| 5,824,963 A * | 10/1998 | Bruns et al. | .................... | 177/136 |
| 5,925,832 A * | 7/1999 | Bruns | ....................... | 73/862.635 |
| 6,145,387 A * | 11/2000 | Garshelis | ................. | 73/862.336 |
| 6,232,566 B1 * | 5/2001 | Bruns | ............................ | 177/139 |
| 6,260,423 B1 * | 7/2001 | Garshelis | ................. | 73/862.336 |
| 7,093,477 B2 * | 8/2006 | Herbold et al. | ................ | 73/1.11 |
| 2004/0045745 A1 * | 3/2004 | Schiebel et al. | .............. | 177/136 |

OTHER PUBLICATIONS

Smartlink; "Improving Chain Performance with Technology"© Renold Power Transmission 2009; <http://www.renold.com/Products/TransmissionChainSprockets/Smartlink.asp>; 4 pgs.

* cited by examiner

*Primary Examiner* — Randy W Gibson
*Assistant Examiner* — Natalie Huls
(74) *Attorney, Agent, or Firm* — Blank Rome LLP

(57) ABSTRACT

A weight sensing apparatus for a lifting device is disclosed that comprises at least one lifting chain attached to a load-engaging device at a first end and a frame at a second end, the load-engaging device being movable with respect to the frame when a lifting force is applied via the at least one lifting chain, at least one force translating arm fixedly attached to a sensor shaft at a first end and rotatably attached to the at least one lifting chain at a second end, the second end of the at least one force translating arm being attached to the at least one lifting chain between the first and second ends of the at least one lifting chain, and a torque sensor mounted on the sensor shaft that is configured to measure torque applied to the sensor bar by the at least one force translating arm when the lifting force is applied to the at least one force translating arm by the at least one lifting chain.

24 Claims, 10 Drawing Sheets

WEIGHT SENSING METHOD AND APPARATUS FOR FORKLIFTS

CROSS-REFERENCE TO RELATED APPLICATION

The present patent application claims the benefit of U.S. Provisional Application Ser. No. 61/306,264, filed Feb. 19, 2010, and U.S. Provisional Application Ser. No. 61/325,083, filed Apr. 16, 2010, the entire disclosures of which are incorporated by reference as if fully set forth herein.

BACKGROUND OF THE INVENTION

1. Field of the Invention

The present invention is directed to weight sensing methods and apparatus for lifting devices. More particularly, the present invention is directed to weight sensing methods and apparatus that can be retrofit into the frames of existing lifting devices to provide more accurate and more reliable weight sensing.

2. Background of Related Art

Often, when loads are carried by forklifts, it is desirable to measure the amount of weight being carried by the forks. Prior techniques for weight sensing required an indirect calculation of the weight being lifted based on inferences derived from hydraulic pressure or electric current flow. Those techniques are limited in accuracy because such indirect calculations cannot compensate for other factors that affect the amount of electric current flow or hydraulic pressure that are unrelated to the weight on the forks.

Other prior techniques employ the use of strain gauge type force sensors incorporated into the forks, which increases both the complexity and the dimensional bulk of the forks. Those methods are often inaccurate and are often more inaccurate over time as mechanical parts wear and greater force is required to move them. Such prior techniques also often fail over time because the physical contact required with the forks to measure weight with a strain gauge may be lost.

Sensing the weight borne by the forks is important for a forklift operator's safety because preventing forklift overload helps avoid accidents. Moreover, knowing and recording the weights borne by the forklift allows for a better service schedule for the forklift. And, knowing the weight of specific objects borne by the forklift can be useful for inventory purposes.

SUMMARY OF THE INVENTION

To address at least the problems described above, it is an object of the present invention to provide a weight sensing apparatus for a lifting device that comprises at least one lifting chain attached to a load-engaging device at a first end and a frame at a second end, the load-engaging device being movable with respect to the frame when a lifting force is applied via the at least one lifting chain, at least one force translating arm fixedly attached to a sensor shaft at a first end and rotatably attached to the at least one lifting chain at a second end, the second end of the at least one force translating arm being attached to the at least one lifting chain between the first and second ends of the at least one lifting chain, and a torque sensor mounted on the sensor shaft that is configured to measure torque applied to the sensor bar by the at least one force translating arm when the lifting force is applied to the at least one force translating arm by the at least one lifting chain.

BRIEF DESCRIPTION OF THE DRAWINGS

With those and other objects, advantages, and features of the invention that may become hereinafter apparent, the nature of the invention may be more clearly understood by reference to the following detailed description of the invention, the appended claims, and to the several drawings attached herein. The drawings are part of the specification. The components in the drawings are not necessarily to scale, emphasis instead being placed upon illustrating the principles of the present invention. And, in the drawings, like reference numerals designate corresponding parts throughout the several views.

DESCRIPTION OF THE EMBODIMENTS

Figure 1A:
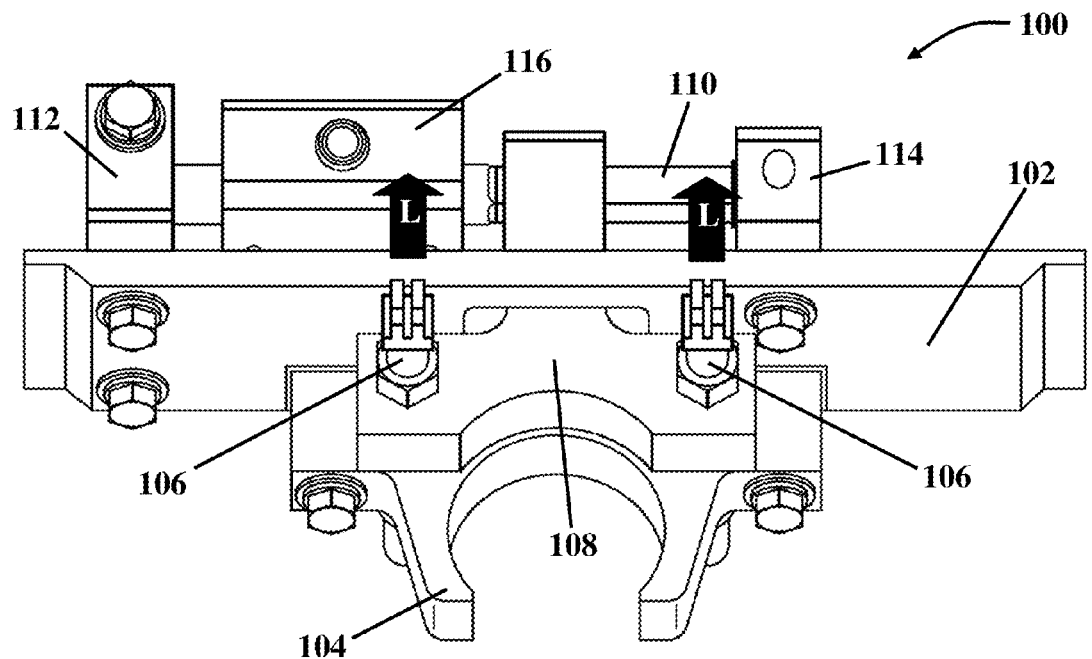
FIGS. 1A and 1B illustrate alternate views of a non-limiting embodiment of a weight sensing apparatus according to the present invention.
Figure 1B:
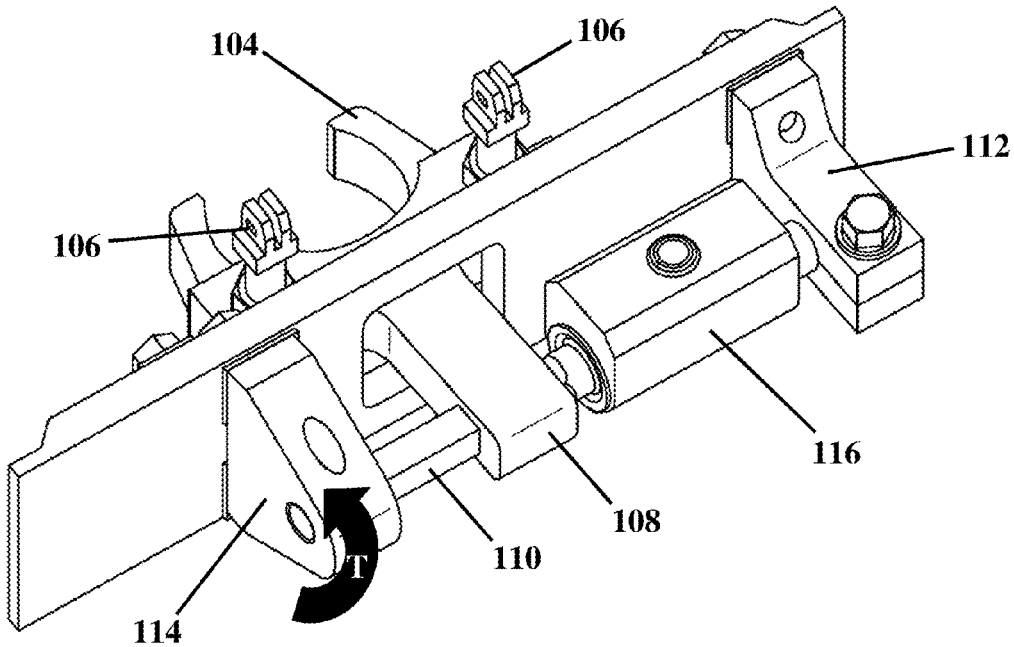
Figure 2A:
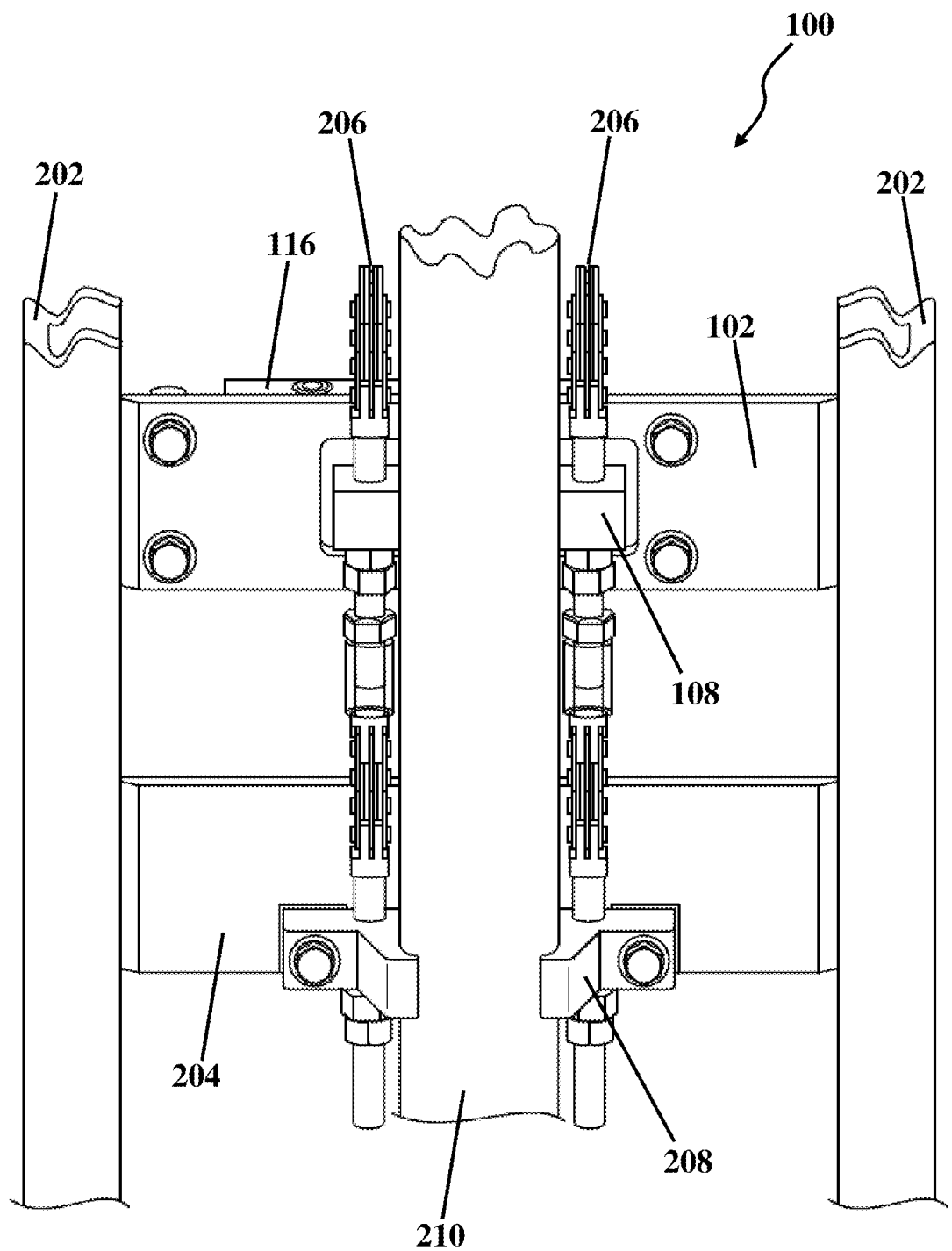
FIGS. 2A and 2B illustrate alternate views of the weight sensing apparatus of FIGS. 1A and 1B installed on a frame.
Figure 2B:
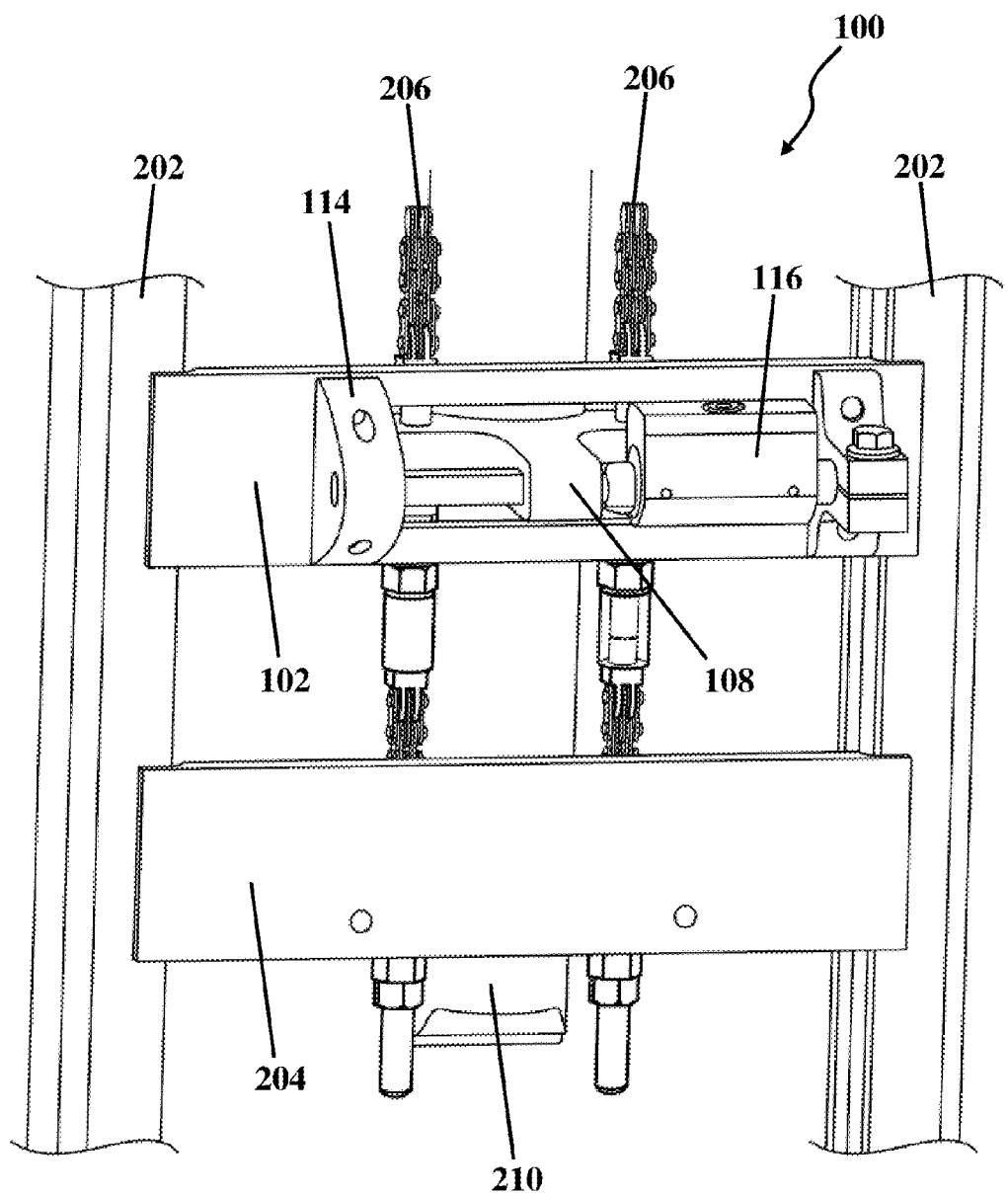

Although several preferred embodiments of the invention are hereinafter described for illustrative purposes, it being understood that the invention may be embodied in other forms not specifically shown in the drawings.

Turning to the figures, FIGS. 1-4 illustrate a first non-limiting embodiment of the weight sensing apparatus 100 of present invention. The weight sensing apparatus 100 includes a retrofit frame bracket 102, a retrofit cylinder bracket 104, a pair of lifting chain connections 106, a lifting force translation arm 108, a sensor shaft 110, a fixed sensor shaft bracket 112, a rotating sensor shaft bracket 114, and a torque sensor 116. The retrofit frame bracket 102 is adapted to be rigidly attached to the frame 202 of a lifting device (e.g., a crane or the forklift trucks 300 and 300' illustrated in FIGS. 3 and 4) at a position above an original equipment manufacturer (OEM) frame bracket 204. The retrofit frame bracket 102 may be attached to the frame 202 by any suitable mechanism, including threaded fasteners and welding (not shown).

Figure 3:
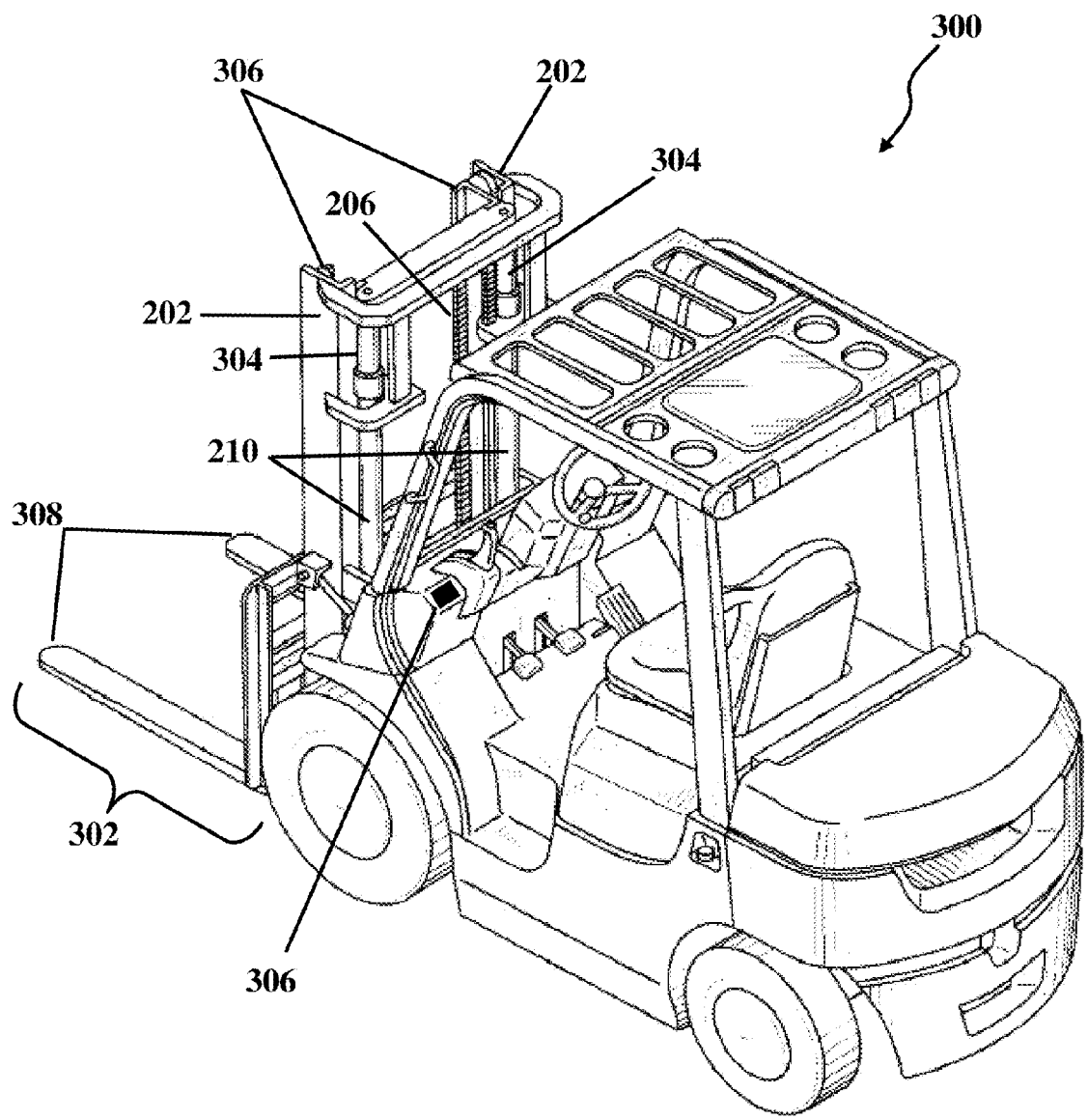
FIG. 3 illustrates an isometric view of a non-limiting exemplary embodiment of a lifting device that can implement the weight sensing apparatus of the present invention.
Figure 4:
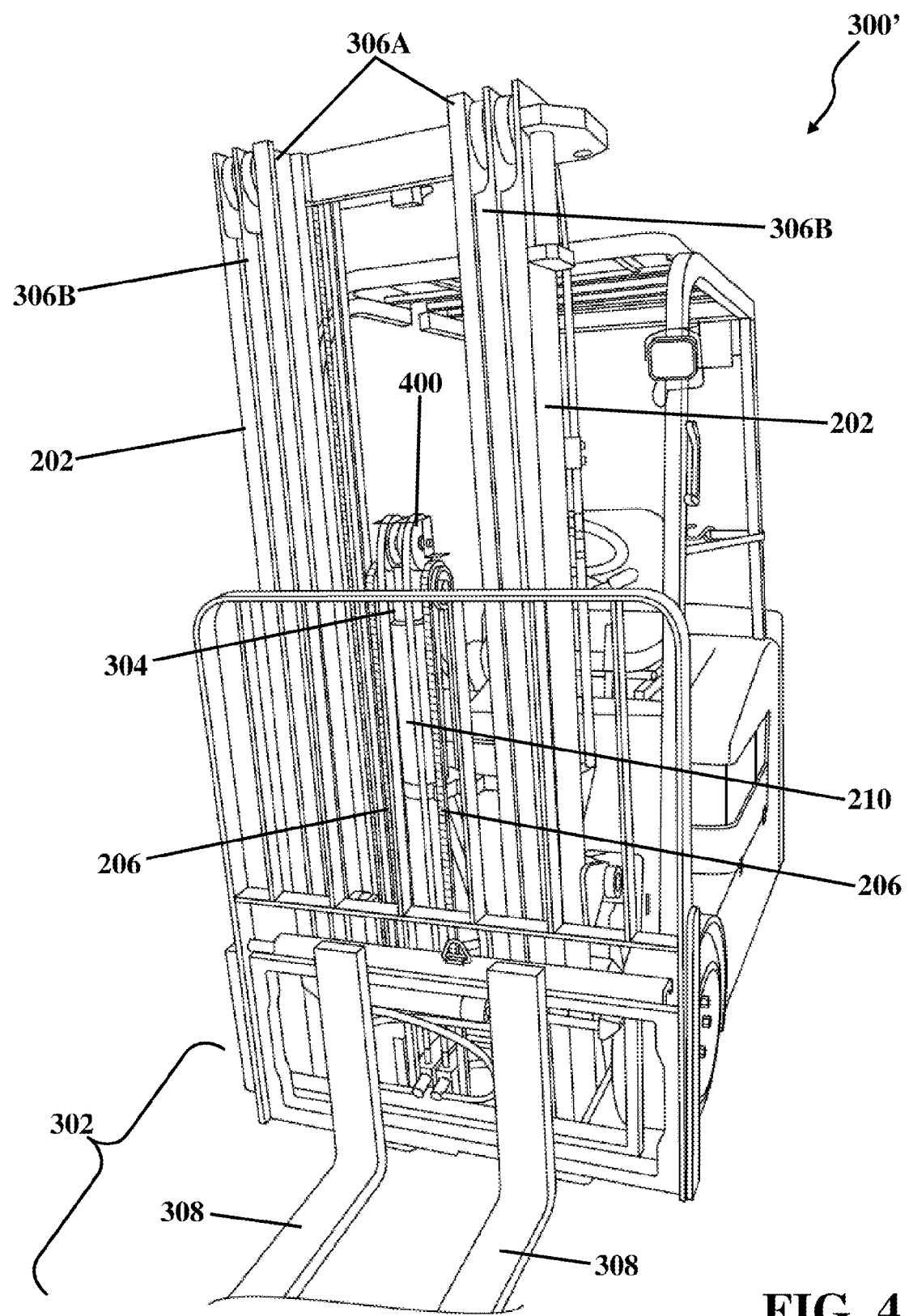
FIG. 4 illustrates an isometric view of another non-limiting exemplary embodiment of a lifting device that can implement the weight sensing apparatus of the present invention.
Figure 5:
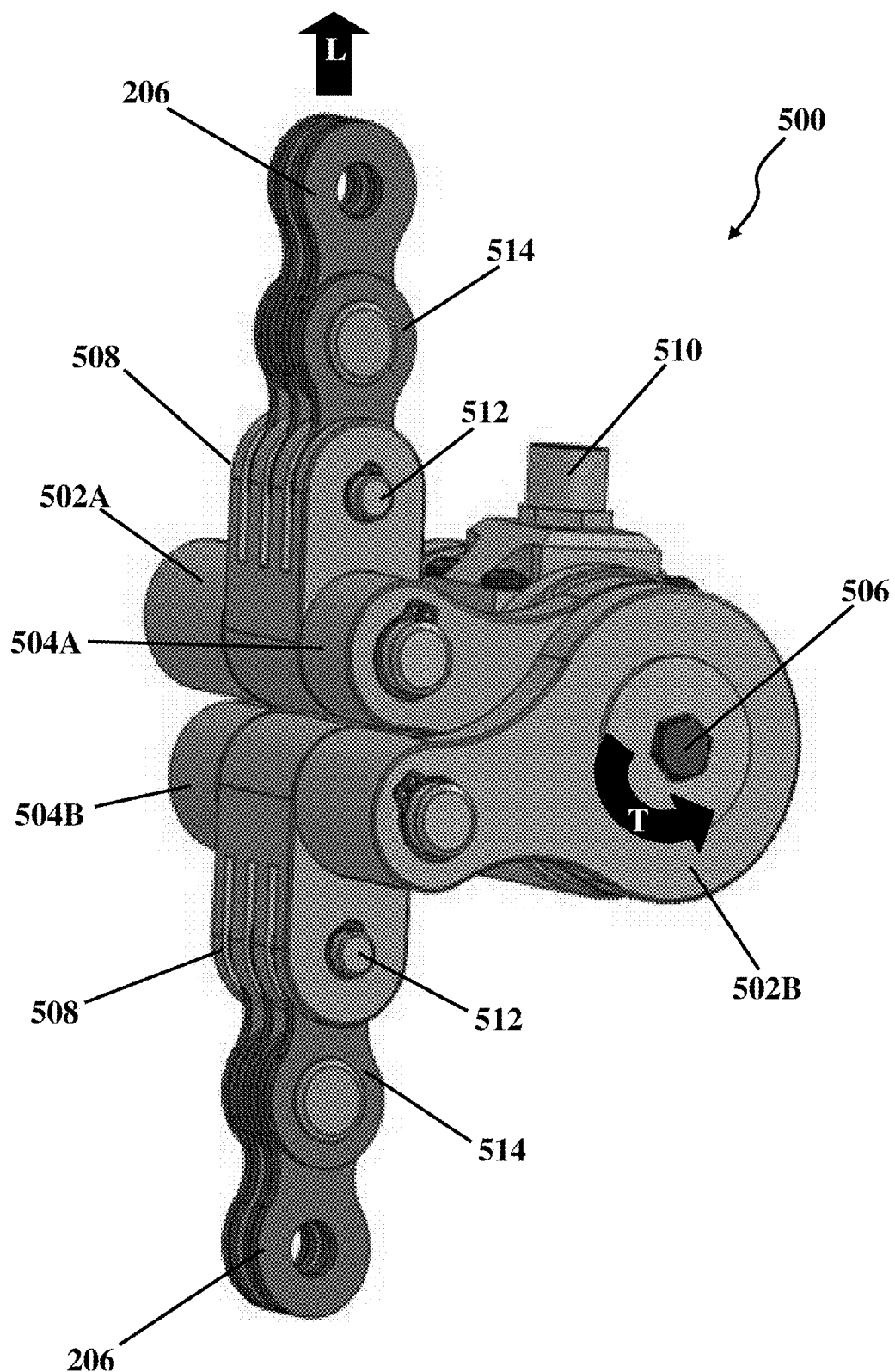
FIGS. 5-9 illustrate alternate views of another non-limiting embodiment of a weight sensing apparatus according to the present invention.
Figure 6:
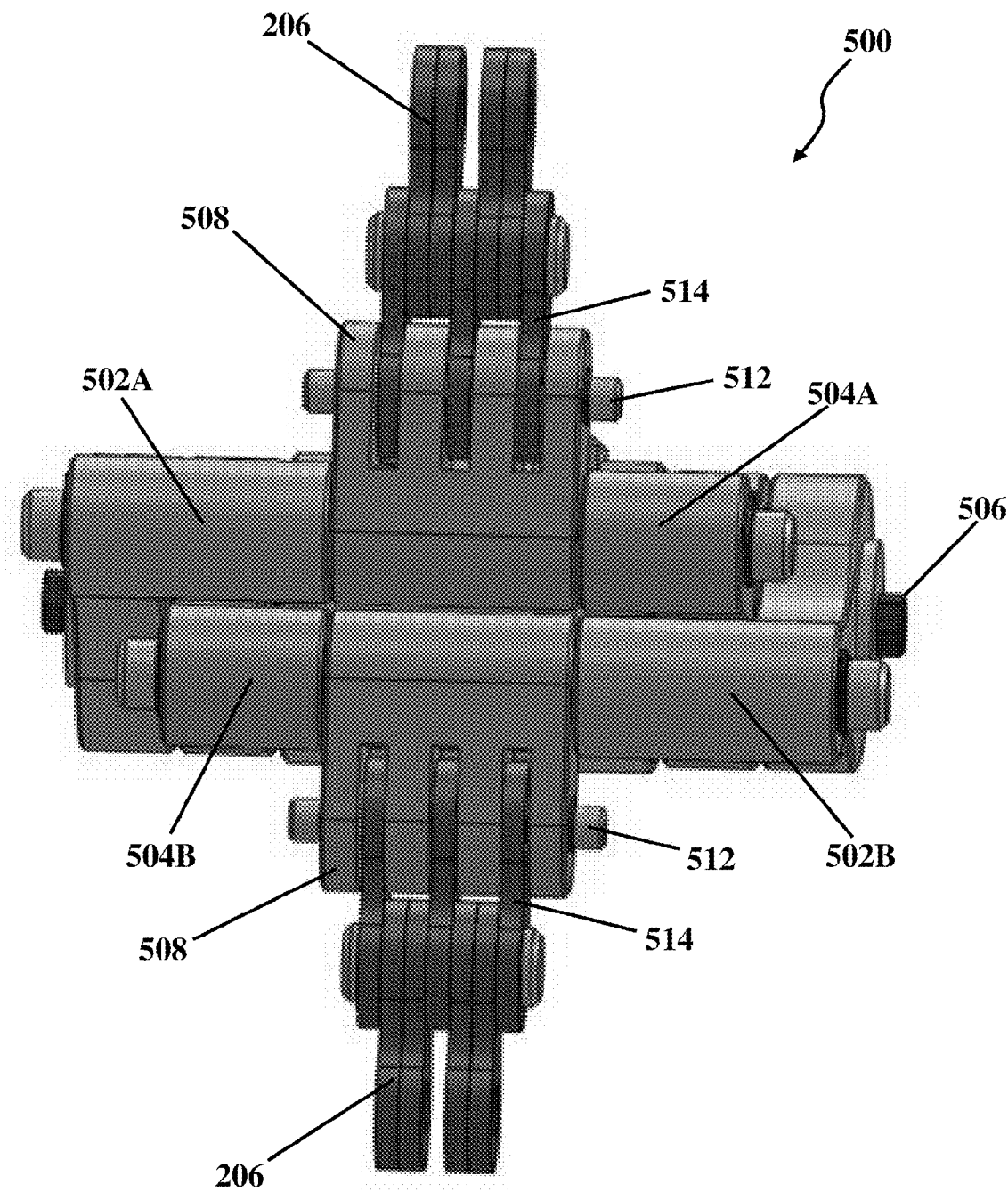
Figure 7:
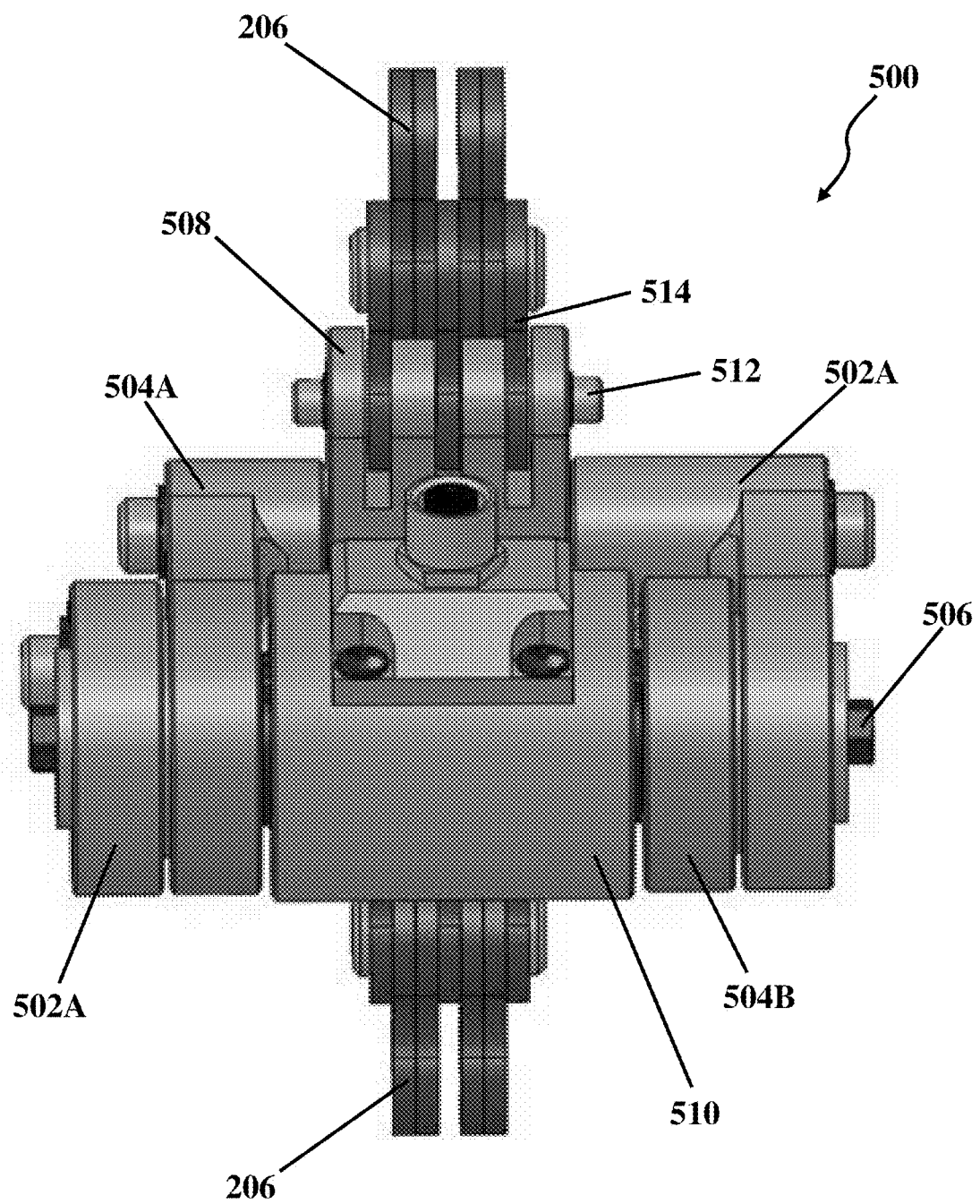
Figure 8:
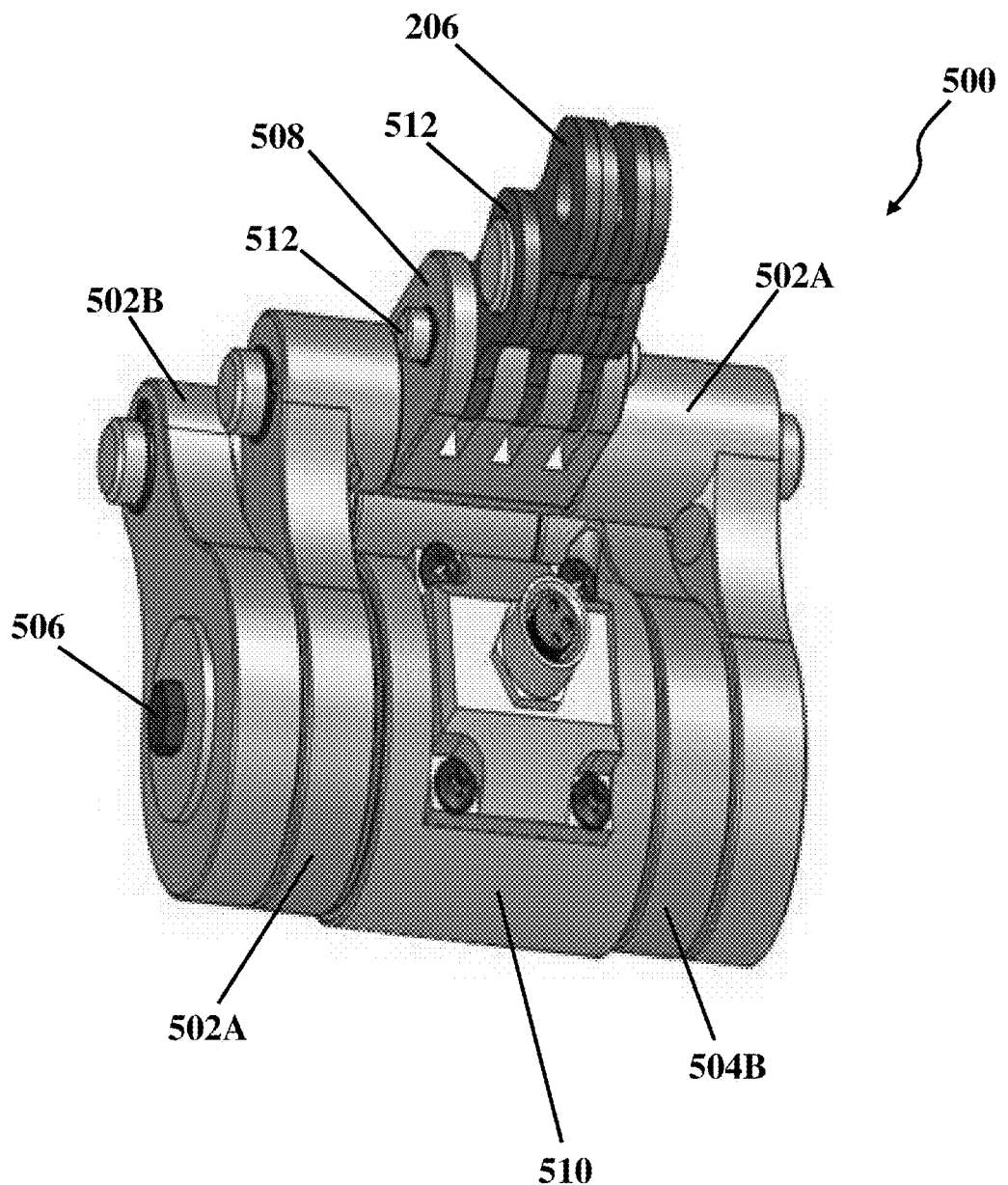
Figure 9:
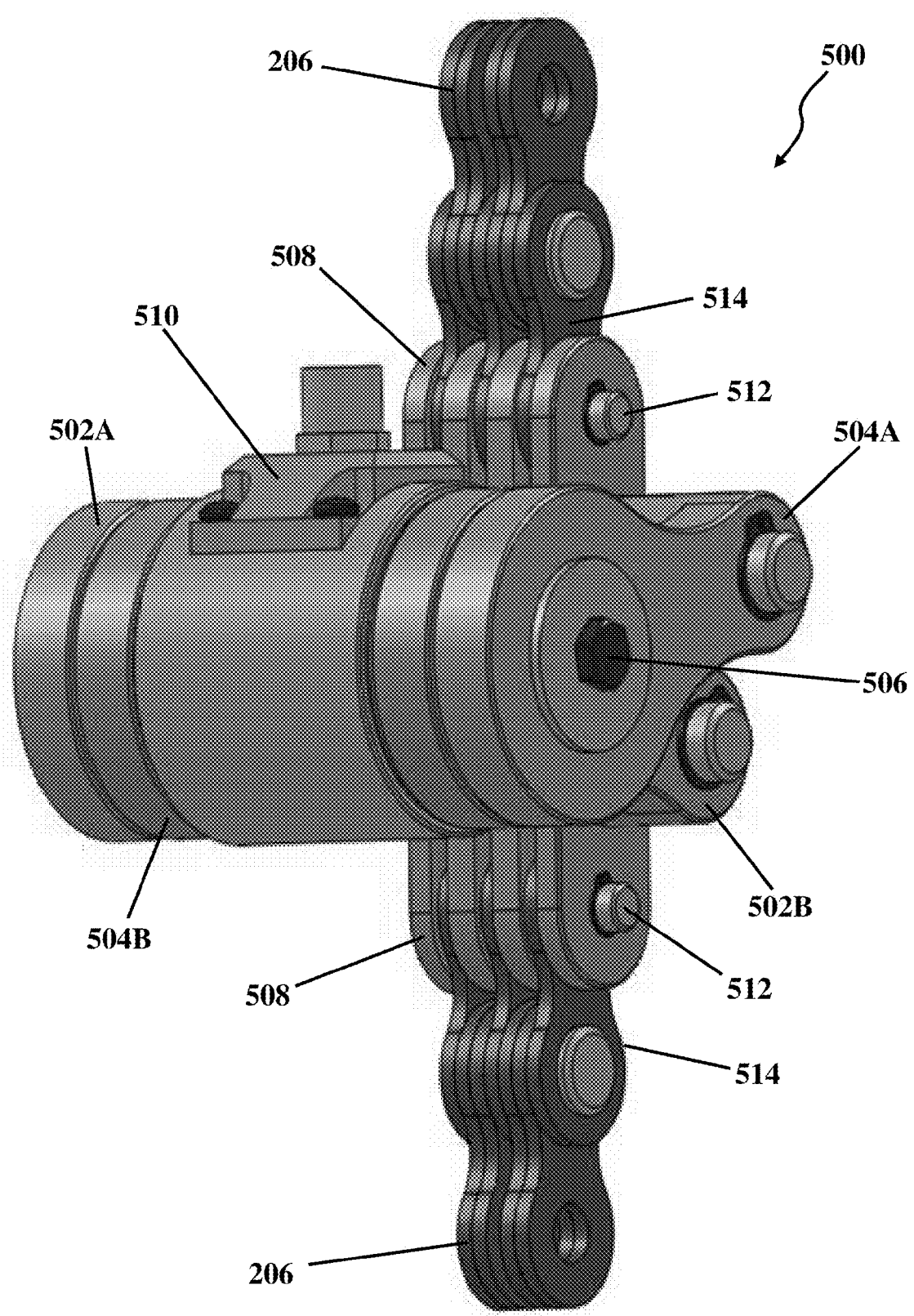

The OEM frame bracket 204 anchors one end of a pair of lifting chains, or cables, 206 to the frame 202 while the other end of the pair of lifting chains 206 are attached to a load-engaging device (e.g., a bucket on a crane or the carriage assembly 302 of the forklift trucks 300 and 300' illustrated in FIGS. 3 and 4) at an OEM cylinder bracket 208. The OEM frame bracket 204 may be connected to the frame 202 in a similar manner as the retrofit frame bracket 102. The pair of lifting chains 206 are configured to support the weight of the load-engaging device and any load "L" it carries.

The retrofit cylinder bracket 104 is adapted to be rigidly attached to the retrofit frame bracket 102 to add rigidity to and prevent deformation at the center of the retrofit frame bracket 102. The retrofit cylinder bracket 104 may be attached to the retrofit frame bracket 102, for example, by welding or a fastening mechanism, such as bolt. Alternatively, the retrofit cylinder bracket 104 may be formed as a contiguous, integral part of the retrofit frame bracket 102. The retrofit cylinder bracket 104 is further adapted to rigidly attach to the frame 202 of a lifting device or a portion thereof, such as the cylinder barrel 210 of the forklift trucks 300 and 300' illustrated in FIGS. 3 and 4. The OEM cylinder bracket 208 is similarly attached to the frame 202 of the lifting device or a portion thereof.

In the forklift trucks 300 and 300' illustrated in FIGS. 3 and 4, the cylinder barrel 210 is fixed to the frame 202 so that it does not move as a piston rod 304 slidably disposed within the cylinder barrel 210 is used to raise and lower the load-engaging device. In the alternative, where the device used to raise and lower the load-engaging device moves as the load-engaging device is raised and lowered (e.g., the rotating hoist drum of a crane), the retrofit cylinder bracket 104 can be attached to any other fixed structure of the frame 202 (e.g., a cross member in a crane boom) that is suitable for adding rigidity to the retrofit frame bracket 102. And although only a single retrofit cylinder bracket 104 and OEM cylinder bracket 208 are illustrated in FIGS. 1A-2B and 4, as many retrofit cylinder brackets 104 and OEM cylinder brackets 208 can be provided as there are cylinder barrels 210, or other comparable fixed structure, on the frame 202 of the lifting device. For example, two retrofit cylinder brackets 104 and two OEM cylinder brackets 208 would be provided for the forklift truck 300 illustrated in FIG. 3 because that forklift truck 300 has two cylinder barrels 210, and one retrofit cylinder bracket 104 and one OEM cylinder bracket 208 would be provided for the forklift truck 300' illustrated in FIG. 4 because that forklift truck 300' only has one cylinder barrel 210.

The pair of lifting chain connections 106 are adapted to attach to the pair of lifting chains 206 at a point between where the lifting chains 206 are anchored to the OEM frame bracket 204 and where the lifting chains 206 are attached to the load-engaging device. Accordingly, the distal ends of the lifting chain connections 106 are adapted to connect between links of the lifting chains 206 using conventional connection interfaces, such as chain pins and link plates. Links can be removed from each lifting chain 206 as required so that each lifting chain 206 maintains the same overall length with the weight sensing apparatus 100 installed. The lifting chain connections 106 are rigidly attached to the lifting force translation arm 108 and slidably extend through corresponding openings in the retrofit cylinder bracket 104.

Opposite to the end of the lifting force translation arm 108 where the lifting chain connections 106 are attached, the lifting force translation arm 108 is attached to the sensor shaft 110. One end of the sensor shaft 110 is restrained from movement by a fixed sensor shaft bracket 112, while the other end of the sensor shaft 110 is rotatably disposed in a rotating sensor shaft bracket 114. Accordingly, one end of the sensor shaft 110 is anchored by the fixed sensor shaft bracket 112 so it cannot rotate or move vertically or horizontally, while the other end of the sensor shaft 110 is free to rotate but prevented from moving vertically or horizontally by the rotating sensor shaft bracket 114. The lifting force translation arm 108 is attached to the sensor shaft 110 closer to the end that is rotatably disposed in the rotating sensor shaft bracket 114 so the sensor shaft 110 can rotate slightly when load "L" is applied to the lifting force translation arm 108. The lifting force translation arm 108 extends through an opening in the retrofit frame bracket 102 that is larger than the cross section of the lifting force translation arm 108 to allow the lifting force translation arm 108 to rotate slightly about the sensor shaft 110 under load "L" without coming into contact with the retrofit frame bracket 102.

The torque sensor 116 is attached to the retrofit frame bracket 102 closer to the end of sensor shaft 110 that is restrained by the fixed sensor shaft bracket 112. The torque sensor 116 has an orifice extending through it that is configured to receive the sensor shaft 110. The torque sensor 116 is configured to measure the torque "T" (FIG. 1B) exerted on the sensor shaft 110 as a load "L" (FIG. 1A) is applied to the lifting force translation arm 108 by the lifting chains 206. For example, the sensor shaft 110 may be magnetized and the torque sensor 116 and sensor shaft 110 may work substantially as described in U.S. Pat. No. 6,145,387 and/or U.S. Pat. No. 6,260,423, the contents of which are herein incorporated by reference. However, other methods of sensing torque, such as a magnetostrictive sensor, a magnetoelastic sensor, a strain gauge, a combination torsion bar/rotational displacement sensor that measures torque as a function of elastic rotational deflection between the end points, and the like are included within the scope of the present invention. The value of torque measured by the torque sensor 116 is directly correlated to the total load carried by the load-engaging device. Accordingly, the configuration of the weight sensing apparatus 100 of present invention is able to accurately measure the total lifting force applied by a load-engaging device.

In FIG. 3, the frame 202 of the forklift truck 300 includes a pair of nested frame rails 306 slidably disposed within the frame 202 on the front of the forklift truck 300. And in FIG. 4, the frame 202 of the forklift truck 300' includes two pair of nested frame rails 306A and 306B. The first pair of nested frame rails 306A is slidably disposed within the frame 202 on the front of the forklift truck 300, and the second pair of nested frame rails 306B is slidably disposed within the first pair of nested frame rails 306A. Thus, in the forklift truck 300' of FIG. 4, the two pair of nested frame rails 306A and 306B operate in a telescoping manner to allow that forklift truck 300' to lift loads "L" higher. Otherwise, the forklift truck 300 illustrated in FIG. 3 lifts loads "L" in substantially the same manner as the forklift truck 300' illustrated in FIG. 4.

In FIGS. 3 and 4, the carriage assembly 302 is slidably attached to the nested frame rails 306 so the carriage assembly 302 can slide up and down the nested frame rails 306 to raise and lower various loads "L" (e.g., pallets of goods and other large objects). And, as discussed above, the nested frame rails 306 can slide up and down within the frame 202 to provide a larger range of motion for the carriage assembly 302. A pair of forks 308 is provided on the carriage assembly 302 for engaging the various loads. The forklift truck 300 also includes a control panel, or graphical user interface, 310 for displaying to a user the weight/load information measured by the weight sensing apparatus 100 of present invention. The control panel 310 may also include an alarm, as described in more detail below. As illustrated in FIG. 3, the control panel 310 is located in the cab of the forklift truck 300, but it may also be provided in any other suitable location, such as on the retrofit frame 102.

In FIG. 3, the forklift truck 300 has two cylinder barrels 210 and two lifting chains 206 (one is hidden from view behind the frame 202). And although the forklift truck 300' illustrated in FIG. 4 only has one cylinder barrel 210, it also has two lifting chains 206. As discussed above, each cylinder barrel 210 includes a corresponding piston rod 304 configured to slide up and down within the cylinder barrel 210. The piston rod 304 slides up and down according to changes in hydraulic pressure within that cylinder barrel 210 such that cylinder barrel 210 and the piston rod 304 operate like a conventional hydraulic cylinder. A sprocket 400 (hidden by frame 202 in FIG. 3) is provided at the upper, distal end of each piston rod 304 so the lifting chains 206 can pass over the distal end of each piston rod 304 as they are raised and lowered. Because one end of each lifting chain 206 is fixed to the OEM frame bracket 204, the carriage assembly 302 will raise and lower as the piston rod 304 of each cylinder barrel 210 is raised and lowered. The lifting chains 206 also engage sprockets (not shown) within the frame 202 and nested frame rails 306.

In operation, the force required to lift a load with the fork 308 is generated with the lifting chains 206. As that load "L" is applied, the lifting chains 206 pull the lifting chain connections 106 upward, which, in turn, pulls the lifting force translation arm 108 upward. Pulling the lifting force translation arm 108 upward causes the end of the sensor shaft 110 near the lifting force translation arm 108 to rotate slightly within the rotating sensor shaft bracket 114 while the other end of end of the sensor shaft 110 remains fixed in the fixed sensor shaft bracket 112. As the lifting force translation arm 108 rotates, the lifting chain connections 106 freely slide through the corresponding openings in the retrofit cylinder bracket 104. The rotational movement of the lifting force translation arm 108 exerts a torque "T" (FIG. 1B) on the sensor shaft 110, which is measured by the torque sensor 116.

Turning now to FIGS. 5-9, those figures illustrate yet another non-limiting exemplary embodiment of a weight sensing apparatus 500 of the present invention. That weight sensing apparatus 500 includes a pair of fixed force translation arms 502, a pair of rotating stabilizing arms 504, a sensor shaft 506, a pair of lifting chain connections 508, and a torque sensor 510. The pair of force translation arms 502 and the pair of stabilizing arms 504 are both attached to the sensor shaft 506 about a common axis. The pair of force translation arms 502 are fixedly attached to the sensor shaft 506 so that they can apply a torque "T" to the sensor shaft 506 when a load "L" is applied to the lifting chain connections 508. And, the pair of stabilizing arms 504 are rotatably attached to the sensor shaft 506 so that the sensor shaft 506 rotates freely in the pair of stabilizing arms 504. In that way, the pair of stabilizing arms 504 provide stability and a balance of upward and downward force to the weight sensing apparatus 500 without applying any torque to the sensor shaft 506.

The distal end of one force translation arm 502A is disposed above and adjacent to the distal end of the other force translation arm 502B. Similarly the distal end of one stabilizing arm 504A is disposed above and adjacent to the distal end of the other stabilizing arm 504B. The pair of force translation arms 502 and the pair of stabilizing arms 504 are configured with respect to one another so that the distal end of the upper force translation arm 502A is aligned with the distal end of the upper stabilizing arm 504A and the distal end of the lower force translation arm 502B is aligned with the distal end of the lower stabilizing arm 504B when they are attached to the sensor shaft 506 at their other ends. That alignment allows one lifting chain connection 508 to be attached between the upper force translation arm 502A and the upper stabilizing arm 504A and one lifting chain connection to be attached between the lower force translation arm 502B and the lower stabilizing arm 504B.

The lifting chain connections 508 are rotatably attached between the upper force translation arm 502A and the upper stabilizing arm 504A and between the lower force translation arm 502B and the lower stabilizing arm 504B. That rotational attachment allows the lifting chain connections 508 to remain in line with the lifting chains 206 as the force translation arms 502 and stabilizing arms 504 rotate about the axis of the sensor shaft 506. The distal ends of the lifting chain connections 508 are adapted to connect between links of the lifting chains 206 using conventional connection interfaces, such as chain pins 512 and link plates 514. Links can be removed from each lifting chain 206 as required so that each lifting chain 206 maintains the same overall length with the weight sensing apparatus 500 installed. One end of the lifting chains 206 is anchored to a fixed structure of a lifting device (e.g., the OEM frame bracket 204 illustrated in FIGS. 2A and 2B) while the other end of the lifting chains 206 is attached to a load-engaging device (e.g., the carriage assembly 302 illustrated in FIGS. 3 and 4). The pair of lifting chains 206 are configured to support the weight of the load-engaging device and any load it carries.

The torque sensor 510 is attached to the sensor shaft 506 between the pair of force translation arms 502 and the pair of stabilizing arms 504. The torque sensor 510 has an orifice extending through it that is configured to receive the sensor shaft 506. The torque sensor 510 is configured to measure the torque "T" (FIG. 8) exerted on the sensor shaft 506 as a load "L" (FIG. 8) is applied by the lifting chains 206 to the pair of force translation arms 502 and the pair of stabilizing arms 504. The torque sensor 510 may work substantially as described above with respect to the embodiment illustrated in FIGS. 1A-2B. The value of torque measured by the torque sensor 510 is directly correlated to the total load on a load-engaging device attached to one end of the lifting chain 206. Accordingly, the configuration of the weight sensing apparatus 500 of present invention is able to accurately measure the total lifting force applied by a load-engaging device.

The weight sensing apparatus 500 illustrated in FIGS. 5-9 can be implemented on the forklift trucks 300 and 300' illustrated in FIGS. 3 and 4 in a similar manner as described for the weight sensing apparatus 100 illustrated in FIGS. 1-4, except that a separate weight sensing apparatus 500 is placed on each lifting chain 206 in the embodiment illustrated in FIGS. 5-9 (i.e., there are two separate weight sensing devices instead of one device when there are two lifting chains 206). The use of separate weight sensing apparatus 500 on separate lifting chains 206 adds a level of redundancy and accuracy by providing two points of measurement.

In operation, the force required to lift a load with the fork 308 is generated with the lifting chains 206. As that load "L" is applied, the lifting chains 206 pull on the pair of force translation arms 502 and the pair of stabilizing arms 504 causing the upper force translation arm 502A and the upper stabilizing arm 504A to move away from the lower force translation arm 502B and the lower stabilizing arm 504B as they rotate about the axis of the sensor shaft 506. Because the force translation arms 502 are fixed to the sensor shaft 506, torque "T" will be exerted on the sensor shaft 506 as the upper force translation arm 502A moves away from the lower force translation arm 502B. That torque "T" is measured by the torque sensor 116. The sensor shaft 506 will merely rotate within the stabilizing arms 504 as the upper stabilizing arm 504A moves away from the lower stabilizing arm 504B as a result of torque-induced elastic deformation about the shaft axis.

In each of the embodiments described above, the weight of the object lifted can be calculated by dividing the measured torque "T" value by the length of the moment arm. In the case of the embodiment illustrated in FIGS. 1A-2B, that length is the distance along the lifting force translation arm 108 between the axis of the sensor shaft 110 and the axis of the attachment point of the lifting chain connections 106 (e.g., a pin connecting the lifting chain connections 106 to the lifting force translation arm 108). That distance should be equal for each lifting chain connection 106. And, in the case of the embodiment illustrated in FIGS. 8-12, that length is the distance along the force translation arms 502 between the axis of the sensor shaft 506 and the axis of the attachment point of the lifting chain connections 508 (e.g., a pin connecting the lifting chain connections 508 between the force translation arms 502 and the stabilizing arms 504). That distance is equal for both the upper force translation arm 502A and the lower force translation arm 502B.

The weight of the load measured can be calculated and displayed to the user in a variety of ways. Preferably, a first threshold weight is established that corresponds to the weight of the load-engaging device with no additional load applied (e.g., the tare weight of the carriage assembly 302 and forks 308 of the forklift trucks 300 and 300' illustrated in FIGS. 3 and 4). That weight can be subtracted from the weight measured when the load-engaging device is carrying a load to give the actual weight of the load. And, a second threshold weight is established that corresponds to the maximum weight the lifting device (e.g., the forklift trucks 300 and 300' illustrated in FIGS. 3 and 4) can safely carry. As the second threshold weight is approached during load lifting, an alarm will sound to indicate that too much weight is being carried. An appropriate circuit or circuits and programming code can be used to achieve those functions.

The system may also provide a controller associated with a microcomputer that may use factors like mast height, load angle (the angle of the load may change as the frame is tilted fore and aft), and speed (as non-limiting examples) to determine if the lifting device is being operated in a safe manner. Suitable sensors, circuits, and programming code could be used to provide information (signals) relevant to those factors. An alarm may be configured to sound if the detected parameters are outside of the desired limits. Additionally, the detected weight borne by the load-engaging device may be recorded in a memory device. The recorded values may then be used to improve service frequency, to assist in accident reconstruction, to monitor unsafe operation of the lifting device, and to address warranty related issues.

Each of the disclosed embodiments can be installed in new lifting devices (i.e., as OEM equipment during manufacture) or retrofitted into existing lifting devices (i.e., as after-market equipment). Although two specific examples have been described for a newly manufactured forklift and a forklift being retrofitted, other modifications are within the scope of the present invention. In particular, the lifting chains on certain forklift trucks may be terminated in different locations. Despite these different terminations, the forklift trucks share the common feature that the weight borne by the forks is transferred to the lifting chains. By converting the vertical tension in the chains into a rotational torque in the sensor shaft, the object of the present invention can be achieved. Thus, configurations that are modified to address the differing chain terminations are within the scope of the present invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A weight sensing apparatus for a lifting device, the weight sensing apparatus comprising:
   at least one lifting chain attached to a load-engaging device at a first end and a frame at a second end, the load-engaging device being movable with respect to the frame when a lifting force is applied via the at least one lifting chain;
   at least one force translating arm fixedly attached to a sensor shaft at a first end and rotatably attached to the at least one lifting chain at a second end, the second end of the at least one force translating arm being attached to the at least one lifting chain between the first and second ends of the at least one lifting chain; and
   a torque sensor mounted on the sensor shaft that is configured to measure a torque applied to the sensor shaft by the at least one force translating arm when the lifting force is applied to the at least one force translating arm by the at least one lifting chain.

2. The weight sensing apparatus of claim 1, further comprising a first bracket configured to be mounted to the frame, wherein there are at least two lifting chains attached to the at least one force translating arm and the sensor shaft is fixedly attached to the first bracket at one end.

3. The weight sensing apparatus of claim 2, further comprising a cylinder bracket configured to attach to the first bracket at one end and to a cylinder barrel on a forklift truck at a second end.

4. The weight sensing apparatus of claim 3, further comprising:
   a piston rod slidably disposed in the cylinder barrel; and
   a sprocket rotatably disposed at a distal end on the piston rod,
   wherein the at least one lifting chain moves around the sprocket as the piston rod slides in the cylinder barrel so as to move the load-engaging device with respect to the frame.

5. The weight sensing apparatus of claim 4, wherein the first bracket is mounted to the frame via at least one of threaded fasteners and welding.

6. The weight sensing apparatus of claim 1, comprising a pair of force translating arms fixedly attached to the sensor shaft at the first ends and rotatably attached to the at least one lifting chain at the second ends, wherein the second ends of the pair of force translating arms are configured to move away from each other when the lifting force is applied to the pair of force translating arms by the at least one lifting chain.

7. The weight sensing apparatus of claim 6, further comprising a pair of stabilizing arms rotatably attached to the sensor shaft at a first end and to the at least one lifting chain at a second end, wherein the second ends of the pair of stabilizing arms move away from each other when the lifting force is applied to the pair of stabilizing arms by the at least one lifting chain.

8. The weight sensing apparatus of claim 7, wherein
   a first of the pair of force translating arms and a first of the pair of stabilizing arms are attached to a first portion of the at least one lifting chain between the first and second ends of the at least one lifting chain; and
   a second of the pair of force translating arms and a second of the pair of stabilizing arms are attached to a second portion of the at least one lifting chain between the first and second ends of the at least one lifting chain.

9. The weight sensing apparatus of claim 8, wherein the pair of stabilizing arms are configured to balance upward and downward forces applied to the weight sensing apparatus.

10. The weight sensing apparatus of claim 1, further comprising a device for calculating and displaying a weight of a load based on the measured torque.

11. The weight sensing apparatus of claim 10, further comprising an alarm that alerts a user when the weight of the load exceeds or approaches a predetermined value.

12. The weight sensing apparatus of claim 1, wherein the torque sensor includes at least one of a magnetoelastic sensor, a magnetostrictive sensor, and a strain gauge.

13. A method for sensing weight with a lifting device, the method comprising the steps of:
- attaching at least one lifting chain to a load-engaging device at a first end;
- attaching the at least one lifting chain to a frame at a second end, the load-engaging device being movable with respect to the frame when a lifting force is applied via the at least one lifting chain;
- fixedly attaching at least one force translating arm to a sensor shaft at a first end;
- rotatably attaching the at least one force translating arm to the at least one lifting chain at a second end, the second end of the at least one force translating arm being attached to the at least one lifting chain between the first and second ends of the at least one lifting chain; and
- mounting a torque sensor on the sensor shaft, the torque sensor being configured to measure a torque applied to the sensor shaft by the at least one force translating arm.

14. The method of claim 13, further comprising the step of mounting a first bracket to the frame, wherein there are at least two lifting chains attached to the at least one force translating arm and the sensor shaft is fixedly attached to the first bracket at one end.

15. The method of claim 14, further comprising the step of attaching a cylinder bracket to the first bracket at one end and to a cylinder barrel on a forklift truck at a second end.

16. The method of claim 15, wherein:
- a piston rod is slidably disposed in the cylinder barrel; and
- a sprocket is rotatably disposed at a distal end on the piston rod,
- wherein the step of applying the lifting force includes the at least one lifting chain moving around the sprocket as the piston rod slides in the cylinder barrel so as to move the load-engaging device with respect to the frame.

17. The method of claim 16, wherein the step of mounting the first bracket to the frame includes mounting the first bracket to the frame via at least one of threaded fasteners and welding.

18. The method of claim 13, wherein the step of attaching at least one lifting chain to the load-engaging device at the first end and the frame at the second end comprises fixedly attaching a pair of force translating arms to the sensor shaft at the first ends and rotatably attaching the pair of force translating arms to the at least one lifting chain at the second ends, wherein the second ends of the first pair of force translating arms move away from each other when the lifting force is applied to the pair of force translating arms by the at least one lifting chain.

19. The method of claim 18, further comprising the steps of:
- rotatably attaching a pair of stabilizing arms to the sensor shaft at a first end; and
- rotatably attaching the pair of stabilizing arms to the at least one lifting chain at a second end,
- wherein the second ends of the pair of stabilizing arms move away from each other when the lifting force is applied to the pair of stabilizing arms by the at least one lifting chain.

20. The method of claim 19, wherein
- a first of the pair of force translating arms and a first of the pair of stabilizing arms are attached to a first portion of the at least one lifting chain between the first and second ends of the at least one lifting chain; and
- a second of the pair of force translating arms and a second of the pair of stabilizing arms are attached to a second portion of the at least one lifting chain between the first and second ends of the at least one lifting chain.

21. The method of claim 20, wherein the pair of stabilizing arms balance upward and downward forces applied to the weight sensing apparatus.

22. The method of claim 13, further comprising the steps of:
- applying the lifting force to the at least one force translating arm with the at least one lifting chain;
- measuring the torque applied to the sensor shaft by the at least one translating arm; and
- calculating a weight of a load based on the measured torque.

23. The method of claim 22, further comprising the step of alerting a user with an alarm when the weight of the load exceeds or approaches a predetermined value.

24. The method of claim 13, wherein the torque sensor includes at least one of a magnetoelastic sensor, a magnetostrictive sensor, and a strain gauge.

* * * * *